(12) United States Patent
Sugimoto

(10) Patent No.: US 11,340,486 B2
(45) Date of Patent: May 24, 2022

(54) ELECTRO-OPTICAL DEVICE AND ELECTRONIC DEVICE

(71) Applicant: SEIKO EPSON CORPORATION, Tokyo (JP)

(72) Inventor: Yohei Sugimoto, Suwa-Gun Fujimi-Machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/224,079

(22) Filed: Apr. 6, 2021

(65) Prior Publication Data

US 2021/0311350 A1 Oct. 7, 2021

(30) Foreign Application Priority Data

Apr. 7, 2020 (JP) .............................. JP2020-068857

(51) Int. Cl.
| | |
|---|---|
| *G02F 1/1333* | (2006.01) |
| *G03B 21/14* | (2006.01) |
| *G02F 1/1335* | (2006.01) |
| *G03B 21/00* | (2006.01) |
| *G03B 21/16* | (2006.01) |

(52) U.S. Cl.
CPC .. *G02F 1/133385* (2013.01); *G02F 1/133526* (2013.01); *G03B 21/006* (2013.01); *G03B 21/145* (2013.01); *G03B 21/16* (2013.01)

(58) Field of Classification Search
None
See application file for complete search history.

(56) References Cited

U.S. PATENT DOCUMENTS

| | | | |
|---|---|---|---|
| 2010/0020263 A1* | 1/2010 | Murao | .............. G02F 1/133526 349/187 |
| 2018/0149952 A1 | 5/2018 | Matsumoto et al. | |
| 2018/0224692 A1* | 8/2018 | Miyashita | ......... G02F 1/133385 |
| 2019/0196314 A1 | 6/2019 | Matsumoto et al. | |

FOREIGN PATENT DOCUMENTS

JP 2018084727 5/2018

* cited by examiner

*Primary Examiner* — Phu Vu
(74) *Attorney, Agent, or Firm* — JCIPRNET

(57) ABSTRACT

An electro-optical device includes an electro-optical panel and a frame configured to support the electro-optical panel. The electro-optical panel includes a first member being a translucent substrate body, a second member being a translucent film and opposed to the first member, and pixel electrodes provided at an opposite side from the first member with respect to the second member. Lens surfaces having a protruding curved surface and each overlapping, in plan view, with each one of pixel electrodes are formed at a surface of the second member that is opposed to the first member. Since an inlet passage and an outlet passage, each of which communicates with the space, are formed between the first member and the second member, a refrigerant is caused to pass through the space by way of the frame, whereby it is possible to cool the electro-optical panel.

8 Claims, 14 Drawing Sheets

ELECTRO-OPTICAL DEVICE AND ELECTRONIC DEVICE

The present application is based on, and claims priority from JP Application Serial Number 2020-068857, filed on Apr. 7, 2020, the disclosure of which is hereby incorporated by reference herein in its entirety.

BACKGROUND

1. Technical Field

The present disclosure relates to an electro-optical device and an electronic device.

2. Related Art

In a case of an electro-optical device such as a liquid crystal device used as a light valve in a projection-type display device, liquid crystal materials deteriorate when temperatures of a liquid crystal panel or the like increase due to light from a light source. Thus, it is conceived to provide a technique that passes a refrigerant within a frame that holds the liquid crystal panel, thereby cooling the liquid crystal panel (see JP-A-2018-84727).

However, the configuration described in JP-A-2018-84727 cools the liquid crystal panel using the refrigerant through the frame, and hence, has a problem in that it is difficult to increase cooling efficiency.

SUMMARY

In order to solve the problem described above, an electro-optical device according to the present disclosure includes an electro-optical panel including a first member having a translucent property, a second member having a translucent property and opposed to the substrate body with a space being interposed therebetween, and a plurality of pixel electrodes provided at an opposite side from the first member with respect to the second member, in which a lens surface having a protruding curved surface is formed at either one of a surface, opposed to the second member, of the first member, and a surface, opposed to the first member, of the second member, the lens surface overlapping, in plan view, with each one of the plurality of pixel electrodes, and the space communicates with an inlet passage through which a refrigerant flows into the space, and also communicates with an outlet passage through which the refrigerant flows out of the space.

The electro-optical device according to the present disclosure can be used for various types of electronic devices. When an electronic device is a projection-type display device, the electronic device includes a light source unit configured to emit illumination light entering the electro-optical device, and a projection optical system configured to project modulation light emitted from the electro-optical device.

DESCRIPTION OF EXEMPLARY EMBODIMENTS

Figure 1:
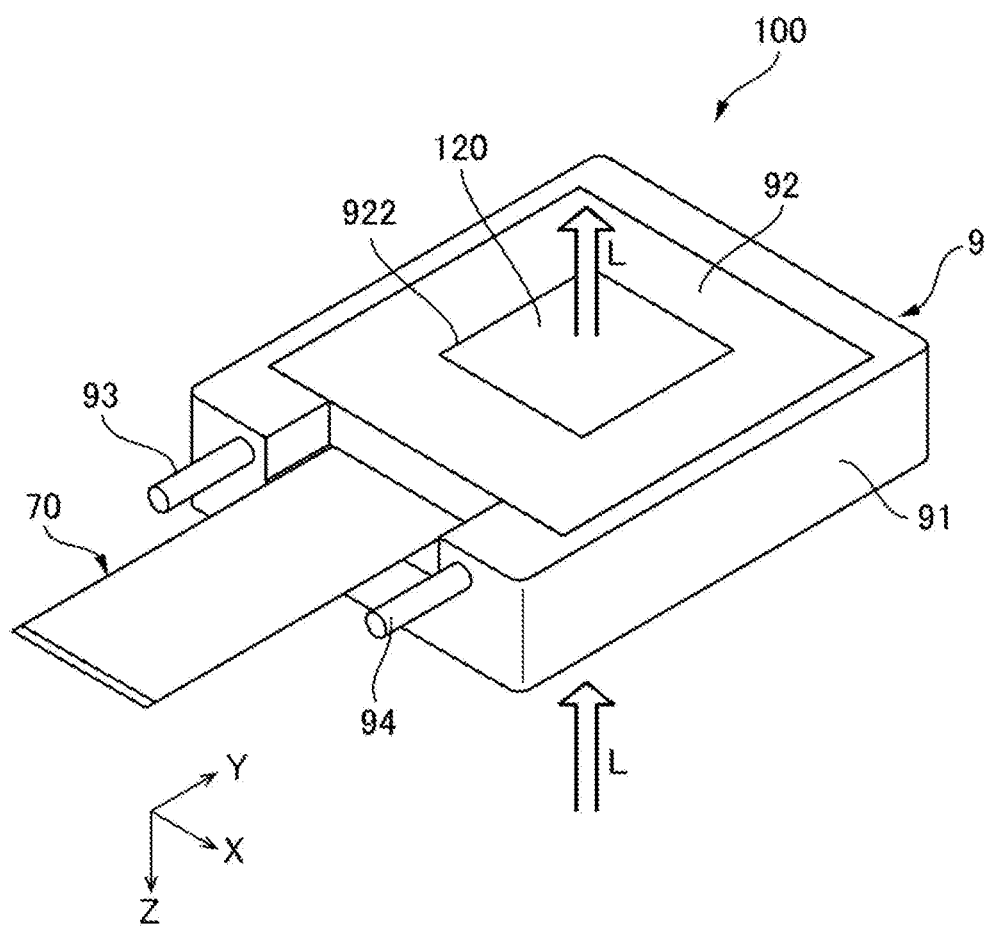
FIG. 1 is a perspective view illustrating an electro-optical device according to a first embodiment of the present disclosure.

Embodiments according to the present disclosure will be described with reference to the drawings. Note that, in each of the figures to be referred to in the following description, each layer or each member is scaled differently from one to another in order to illustrate each layer or each member so as to have a recognizable size in the drawing. Furthermore, in the following description, when a film or the like formed at a first substrate 10 is described, an upper layer means a second substrate 20 side, and a lower layer means an opposite side of the first substrate 10 from the second substrate 20. When a film or the like formed at the second substrate 20 is described, an upper layer means a first substrate 10 side, and a lower layer means an opposite side of the second substrate 20 from the first substrate 10. Further, a plan view means a state as viewed from a normal direction with respect to the first substrate 10 and the second substrate 20. In the present description, where the X-axis and the Y-axis are set as coordinate axes intersecting at right angles within a plane of the first substrate 10, the "plan view" represents viewing from the Z-axis direction perpendicular to the X-axis and the Y-axis.

First Embodiment

1. Overall Configuration

Figure 2:
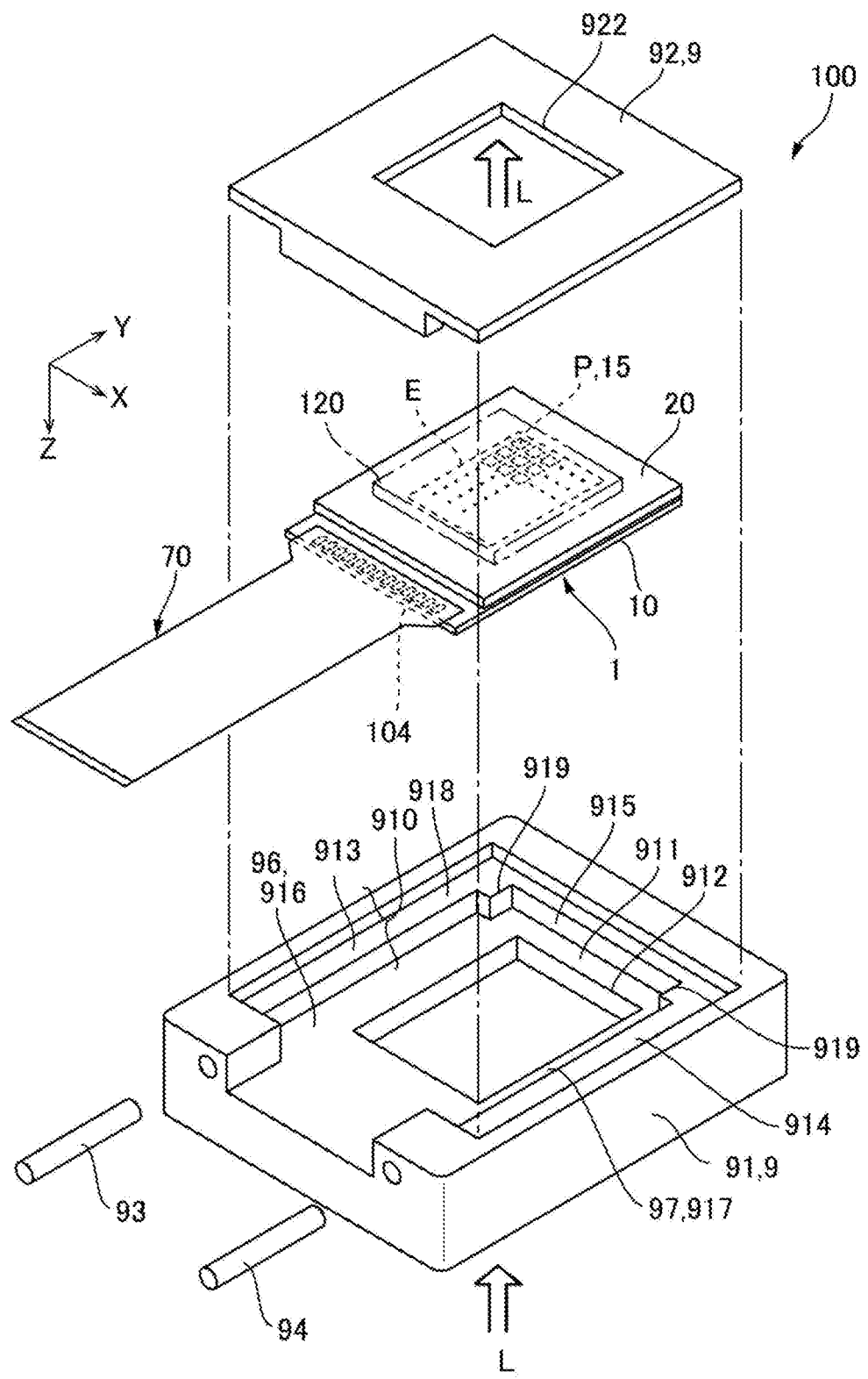
FIG. 2 is an exploded perspective view illustrating the electro-optical device illustrated in FIG. 1.

FIG. 1 is a perspective view of an electro-optical device 100 according to the first embodiment of the present disclosure. FIG. 2 is an exploded perspective view illustrating the electro-optical device 100 illustrated in FIG. 1.

In FIGS. 1 and 2, the electro-optical device 100 includes an electro-optical panel 1 and a frame 9 that holds the electro-optical panel 1. The frame 9 includes a first frame member 91 made of metal and surrounding the periphery of the electro-optical panel 1, and a second frame member 92 made of metal and holding the electro-optical panel 1 between the first frame member 91 and the second frame member 92. The second frame member 92 includes a rectangular opening portion 922 that allows light modulated by the electro-optical panel 1 to be outputted.

The first frame member 91 includes a frame portion 910 that surrounds the periphery of the electro-optical panel 1. The frame portion 910 includes a first accommodation portion 915 including a recessed portion used to accommodate the electro-optical panel 1 therewithin. The electro-optical panel 1 is fixed to the first accommodation portion 915 using a method such as adhesion. The bottom of the first accommodation portion 915 includes a bottom wall 911 that supports the electro-optical panel 1. The bottom wall 911 includes a rectangular opening portion 912 that allows light from a light source to enter. In addition, the frame portion 910 includes a second accommodation portion 918 that accommodates the second frame member 92 therewithin. The second frame member 92 is fixed using a method such as adhesive in a state of being accommodated in the second accommodation portion 918.

2. Configuration of Electro-Optical Panel 1 and the Like

Figure 3:
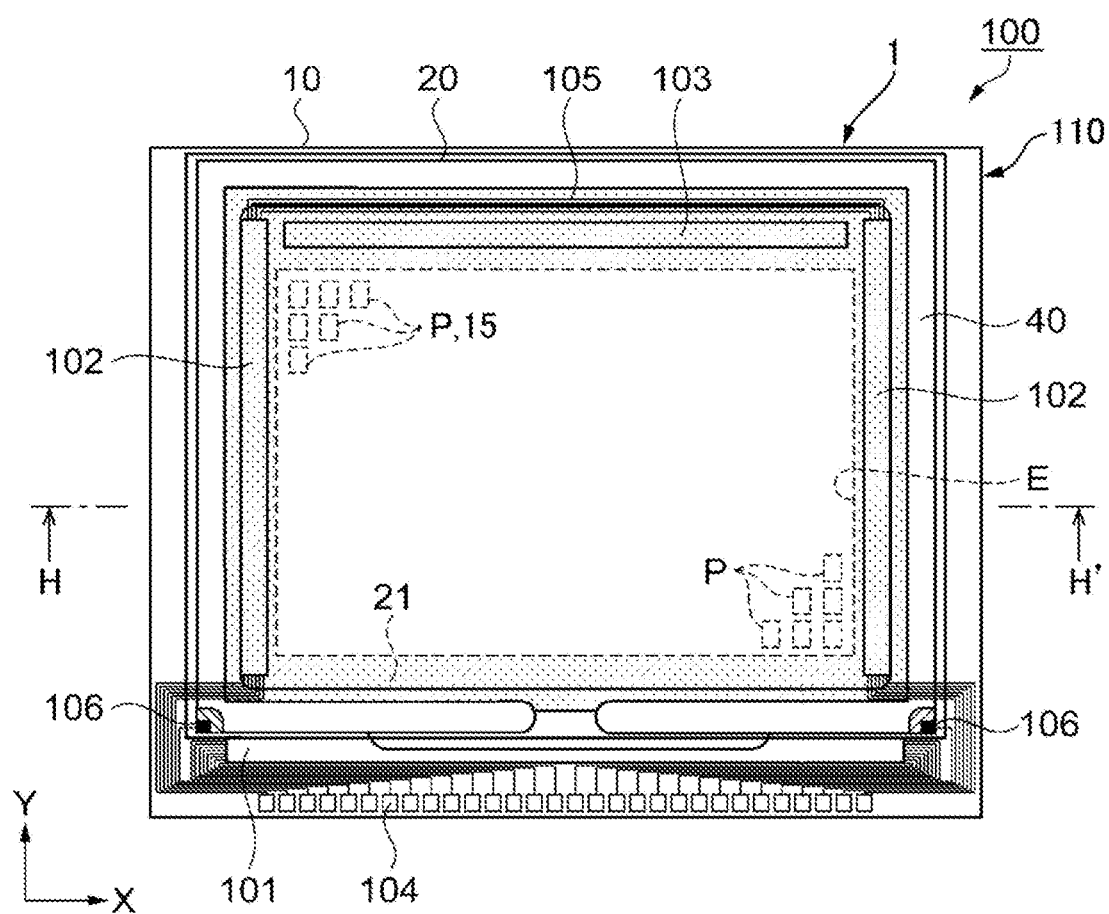
FIG. 3 is an explanatory diagram illustrating a planar configuration of an electro-optical panel illustrated in FIG. 2.
Figure 4:
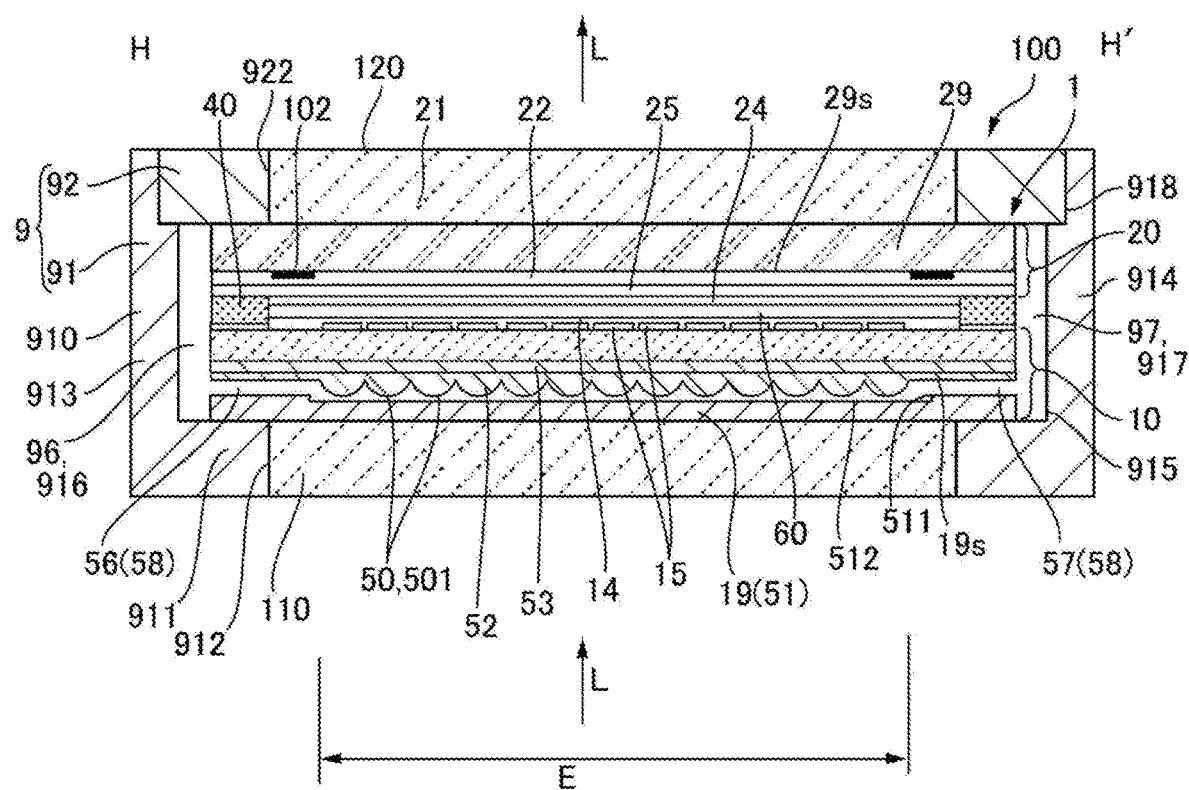
FIG. 4 is a cross-sectional view taken along the H-H' line of the electro-optical panel or the like illustrated in FIG. 3.

FIG. 3 is an explanatory diagram illustrating a planar configuration of the electro-optical panel 1 illustrated in FIG. 2. FIG. 4 is a cross-sectional view taken along the H-H' line of the electro-optical panel 1 illustrated in FIG. 3. The electro-optical panel 1 illustrated in FIGS. 3 and 4 includes a first substrate 10 and a second substrate 20 opposed to the first substrate 10. The first substrate 10 and the second substrate 20 are affixed to each other through a seal material 40 having a frame shape. An electro-optical layer 60 including a liquid crystal layer is held in a space surrounded by the seal material 40 and being disposed between the first substrate 10 and the second substrate 20.

The first substrate 10 is larger than the second substrate 20, and the seal material 40 is disposed along an outer edge of the second substrate 20. The electro-optical layer 60 is made out of a liquid crystal material having a positive or negative dielectric anisotropy. The seal material 40 is made out, for example, of an adhesive such as a thermosetting or ultraviolet-curable epoxy resin, and includes a space (not illustrated) used to maintain a constant space between the first substrate 10 and the second substrate 20.

A pixel area E is provided within a region surrounded by the seal material 40. In the pixel area E, a plurality of pixels P each including a pixel electrode 15 are arranged in a matrix manner. The second substrate 20 includes a partition portion 21 that surrounds the periphery of the pixel area E, the partition portion 21 being provided between the seal material 40 and the pixel area E. The partition portion 21 includes a light shielding layer made out, for example, of a metal or metallic oxide. Although no illustration is given, the light shielding layer may be configured in the second substrate 20 as a black matrix that overlaps with a boundary portion between adjacent pixels P in plan view.

The first substrate 10 includes a light-transmitting substrate body 19 made out, for example, of a quartz substrate, a sapphire substrate, and a glass substrate. Along one side of the first substrate 10, a data-line driving circuit 101 and a plurality of terminals 104 are formed outside the pixel area E and on a one-surface 19s side, which is located on the second substrate 20 side, of the substrate body 19. In addition, a scanning line drive circuit 102 is formed along other sides adjacent to this one side. On the one-surface side 19s of the substrate body 19, an inspection circuit 103 is provided outside the pixel area E and along a side opposed to the side where the terminals 104 are arranged. A plurality of wiring lines 105 configured to couple two scanning line drive circuits 102 are provided on the one-surface side 19s of the substrate body 19 and between the seal material 40 and the inspection circuit 103. The plurality of wiring lines coupled to the data-line driving circuit 101 and the scanning line drive circuit 102 are each coupled correspondingly to the plurality of terminals 104. Below, the X-axis direction represents a direction in which the terminals 104 are arranged, and the Y-axis direction represents a direction perpendicular to the X-axis direction.

A flexible wiring substrate 70 illustrated in FIGS. 1 and 2 is coupled to the terminal 104. Various potentials or various types of signals are inputted through the flexible wiring substrate 70 to the first substrate 10. In addition, at the one-surface 19s side of the substrate body 19, a plurality of translucent pixel electrodes 15 and switching elements (not illustrated in FIG. 4) are formed in pixels P in a matrix manner. The pixel electrodes 15 are made out of an electrically conducting translucent film such as an indium tin oxide (ITO) film. The switching elements are each electrically coupled to each one of the plurality of pixel electrodes 15. A first alignment film 14 is formed at the second substrate 20 side with respect to the pixel electrode 15. The pixel electrodes 15 are covered with the first alignment film 14. Thus, a portion from the substrate body 19 to the first alignment film 14 corresponds to the first substrate 10.

The second substrate 20 includes a light-transmitting substrate body 29 made out, for example, of a quartz substrate, a sapphire substrate, or a glass substrate. At a one-surface 29s side, opposed to the first substrate 10, of the substrate body 29, there are provided a partition portion 21, a flattening layer 22 made out, for example, of silicon oxide and covering the partition portion 21, a common electrode 25 covering the flattening layer 22, and a second alignment film 24 covering the common electrode 25. In plan view, the partition portion 21 surrounds the periphery of the pixel area E and overlaps with the scanning line drive circuit 102 and the inspection circuit 103. Thus, the partition portion 21 blocks light entering the scanning line drive circuit 102 or the like from the second substrate 20 side, thereby preventing malfunction due to the light. The common electrode 25 is made out of an electrically conducting translucent film such as ITO, and is electrically coupled to the terminal 104 through an inter-substrate conduction portion 106 and a wiring line provided at the first substrate 10.

The first alignment film 14 and the second alignment film 24 are selected on the basis of optical design of the electro-optical device 100. The first alignment film 14 and the second alignment film 24 include an inorganic alignment film made out, for example, of silicon oxide (SiOx) and obtained by using a vapor deposition method to form a film, and causes liquid crystal molecules having negative dielectric anisotropy to be substantially vertically aligned. The first alignment film 14 and the second alignment film 24 may include an organic alignment film made out, for example, of polyimide formed through a rubbing process applied to the surface. The organic alignment film causes liquid crystal molecules having positive dielectric anisotropy to be substantially horizontally aligned.

In the electro-optical device 100 according to the present embodiment, the pixel electrode 15 and the common electrode 25 are made out of an electrically conducting translucent film. The electro-optical device 100 is configured as a translucent-type liquid crystal device. With such an electro-optical device 100, light, which is the visible light, enters the electro-optical layer 60 from either one substrate of the first substrate 10 and the second substrate 20, and passes through the other substrate to be outputted. During this travel, the light is modulated, and an image is displayed. In the present embodiment, as indicated by the arrow L in FIG. 4, light enters the electro-optical layer 60 from the first substrate 10 side, and passes through the second substrate 20 to be outputted. During this travel, the light is modulated, and an image is displayed. Thus, the first substrate 10 is provided on the light entrance side, and the second substrate 20 is opposed to the first substrate 10 at the light exit side. In this specification, "translucent" is same as "light transmissive".

The electro-optical device 100 according to the present embodiment is configured as a liquid crystal device using a normally white mode or a normally black mode, the mode of which depends on the optical design of a polarizing element disposed at each of the light entrance side and the light exit side. In the normally white mode, the transmittance of the pixel P is the maximum in a state where no voltage is applied. In the normally black mode, the transmittance of the pixel P is minimum in a state where no voltage is applied.

In the present embodiment, when the electro-optical panel 1 is used in a projection-type display device, a translucent dustproof glass 110, 120 is attached on an outer surface of the first substrate 10 and an outer surface of the second substrate 20 with the aim of preventing a foreign substance attached on outer surfaces of the first substrate 10 and the second substrate 20 from being seen in an image.

3. Electrical Configuration

Figure 5:
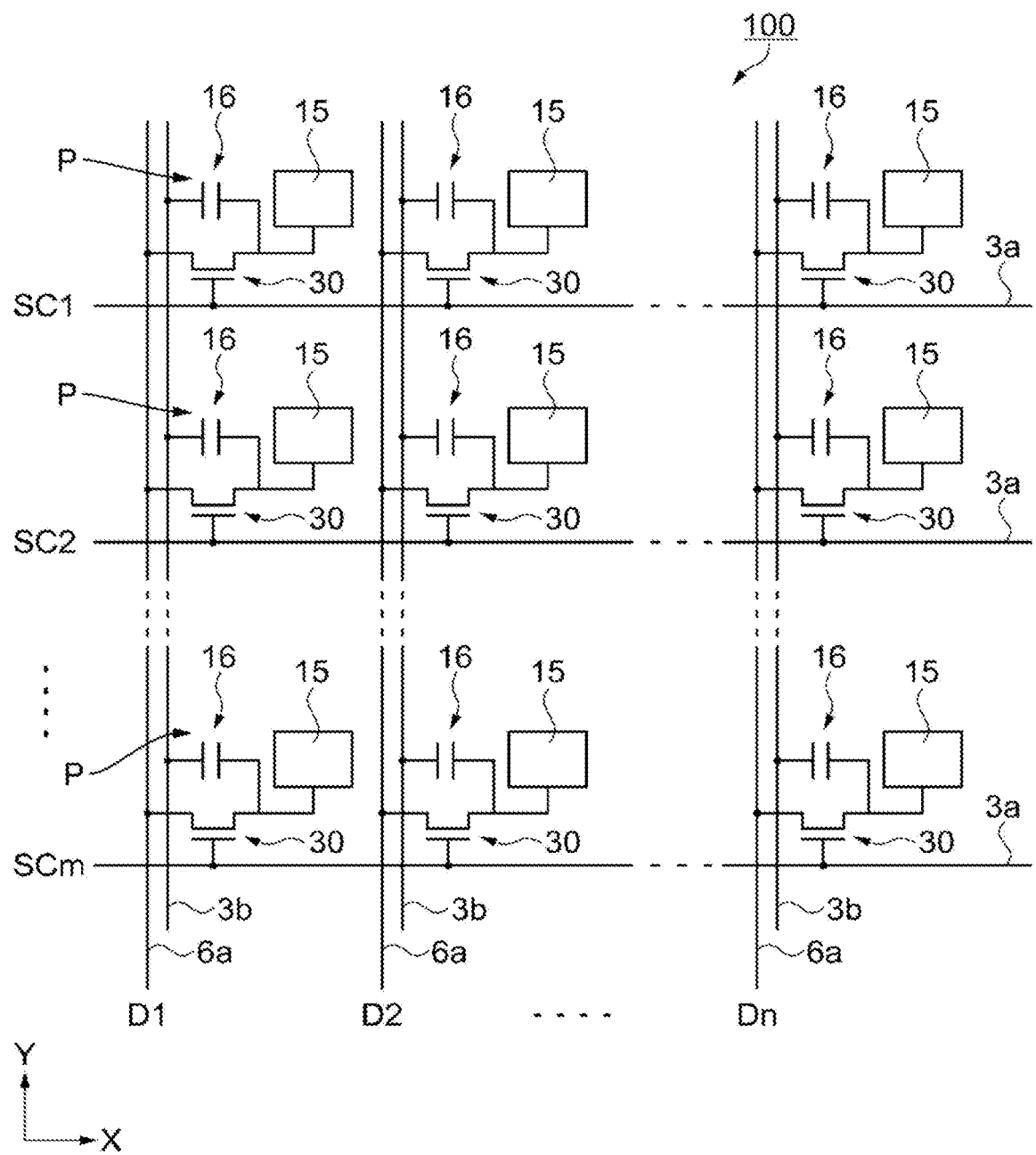
FIG. 5 is an explanatory diagram illustrating an electrical configuration of the electro-optical panel illustrated in FIG. 3.

FIG. 5 is an explanatory diagram illustrating an electrical configuration of the electro-optical panel 1 illustrated in FIG. 3. As illustrated in FIG. 5, the electro-optical panel 1 includes a plurality of scanning lines 3a extending in the X-axis direction at least in the pixel area E, and a plurality of data lines 6a extending in the Y-axis. The scanning lines 3a and the data lines 6a are insulated from each other at the first substrate 10. In the present embodiment, the first substrate 10 includes a capacitance line 3b extending along the data lines 6a. In addition, the pixels P are provided at corresponding intersections between the plurality of scanning lines 3a and the plurality of data lines 6a. The plurality of pixels P each include a pixel electrode 15, a switching element 30 including a thin film transistor (TFT), and a storage capacitor 16. The scanning lines 3a are each electrically coupled to a gate of the switching element 30. The data lines 6a are each electrically coupled to a source of the switching element 30. The pixel electrode 15 is electrically coupled to a drain of the switching element 30.

The data lines 6a are coupled to the data-line driving circuit 101 illustrated in FIG. 3, and supply the pixels P with image signals D1, D2, . . . , and Dn supplied from the data-line driving circuit 101. The scanning lines 3a are coupled to the scanning line drive circuit 102 illustrated in FIG. 3, and sequentially supply the pixels P with scanning signals SC1, SC2, . . . , and SCm supplied from the scanning line driving circuit 102. The image signals D1 to Dn supplied from the data-line driving circuit 101 to the data lines 6a may be supplied in this order in a line sequential manner, or may be supplied on a group-by-group basis, the group being comprised of a plurality of data lines 6a adjacent to each other. The scanning line drive circuit 102 supplies, in a line sequential manner, the scanning lines 3a with the scanning signals SC1 to SCm at predetermined timing.

In the electro-optical panel 1, during a period of time when the scanning signals SC1 to SCm are inputted to bring the switching element 30 into an ON state, the image signals D1 to Dn supplied from the data lines 6a are written in the pixel electrode 15 at predetermined timing. The image signals D1 to Dn written in the electro-optical layer 60 through the pixel electrodes 15 and set at a predetermined level are retained for a certain period of time between the pixel electrodes 15 and the common electrode 25 disposed so as to be opposed to the pixel electrodes 15 with the electro-optical layer 60 being interposed therebetween. The frequency of the image signals D1 to Dn is 60 Hz, for example. In the present embodiment, the storage capacitor 16 is coupled in parallel with a liquid crystal capacitor formed between the pixel electrode 15 and the common electrode 25 in order to prevent a leakage of the image signals D1 to Dn retained between the pixel electrode 15 and the electro-optical layer 60. The storage capacitor 16 is provided between the drain of the switching element 30 and the capacitance line 3b.

The data lines 6a are coupled to the inspection circuit 103 illustrated in FIG. 3, and the inspection circuit 103 is used to check operational defects and the like of the electro-optical device 100 by detecting the image signals described above in a process of manufacturing the electro-optical device 100. Note that, in FIG. 3, the data-line driving circuit 101, the scanning line drive circuit 102, and the inspection circuit 103 are illustrated as peripheral circuits formed on the outer side of the pixel region E. However, as the peripheral circuits, it may be possible to provide a sampling circuit that is configured to sample the image signals described above and supply the sampled image signals to the data lines 6a, a pre-charge circuit that is configured to supply pre-charge signals of a predetermined voltage level to the data lines 6a in advance of the image signals D1 to Dn described above, or the like.

3. Configuration of Lens 50

Figure 6:
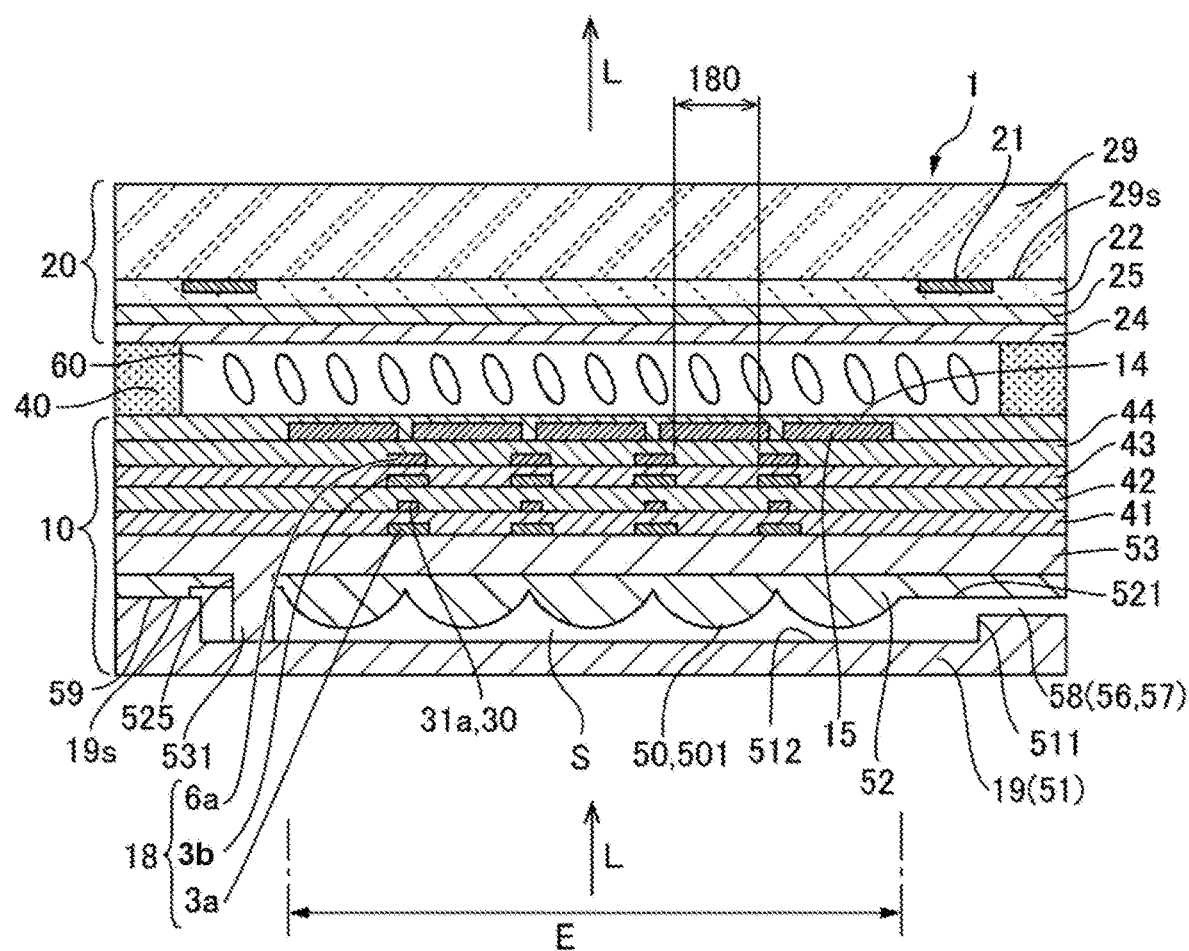
FIG. 6 is a schematic explanatory diagram obtained by enlarging part of the cross section illustrated in FIG. 4.
Figure 7:
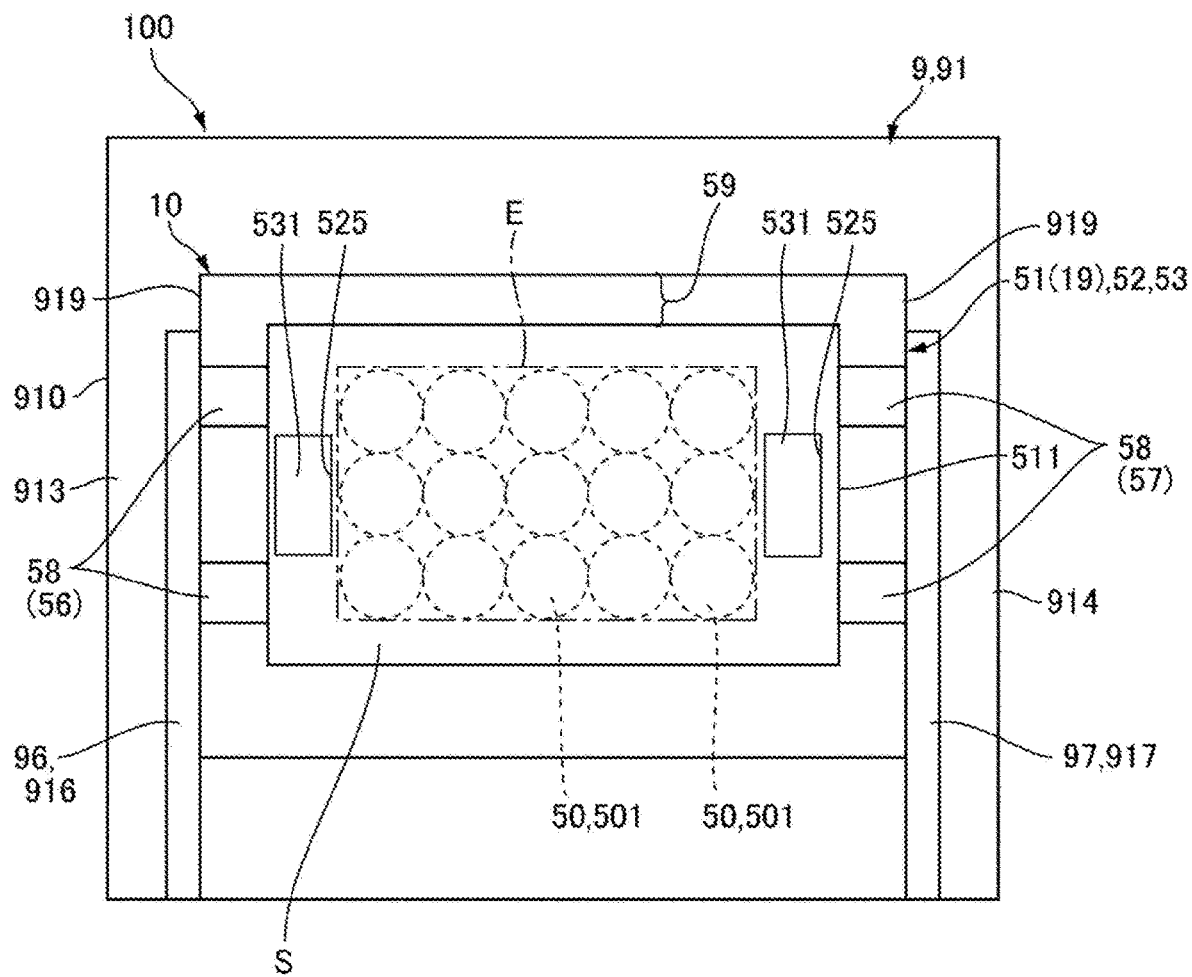
FIG. 7 is an explanatory diagram illustrating a planar arrangement of lenses or the like illustrated in FIG. 6.

FIG. 6 is a schematic explanatory diagram obtained by enlarging part of the cross section illustrated in FIG. 4. FIG. 7 is an explanatory diagram illustrating a planar arrangement of lenses 50 or the like illustrated in FIG. 6. In FIG. 6, translucent interlayer dielectrics 41, 42, 43, and 44 made out, for example, of silicon oxide are sequentially stacked between the substrate body 19 and the pixel electrode 15. Various types of wiring lines and various types of electrodes are disposed between the substrate body 19 and the interlayer dielectric 41 or between layers of the interlayer dielectrics 41, 42, 43, and 44. For example, the scanning lines 3a are formed between the substrate body 19 and the interlayer dielectric 41. The switching element 30 is formed between the interlayer dielectric 41 and the interlayer dielectric 42. The capacitance line 3b is formed between the interlayer dielectric 42 and the interlayer dielectric 43. The data lines 6a are formed between the interlayer dielectric 43 and the interlayer dielectric 44. The pixel electrodes 15 are formed between the interlayer dielectric 44 and the electro-optical layer 60. The scanning line 3a, the capacitance line 3b, and the data line 6a constitute a light shielding member 18 in a lattice form in plan view. In plan view, the light shielding member 18 extends along a portion between adjacent pixel electrodes 15, and overlaps with a semiconductor layer 31a of the switching element 30. Thus, the light shielding member 18 suppresses entrance of light into the semiconductor layer 31a to suppress occurrence of an optical leakage current at the switching element 30.

In the electro-optical panel 1, only the light passing through the light transmission area 180 surrounded by the light shielding member 18 contributes to displaying an image, from among the light entering from the first substrate 10 side. In the present embodiment, the first substrate 10 includes a plurality of lenses 50 provided so as to each overlap with each one of the plurality of pixel electrodes 15 in plan view, with the aim of the light entering from the first substrate 10 side being not blocked by the light shielding member 18 and increasing the percentage at which this light passes through the light transmission area 180.

In the present embodiment, the lens 50 is configured to include a translucent first member 51 and a translucent second member 52 opposed to the first member 51 at the pixel electrode 15 side. A space S is interposed between these members. A plurality of lens surfaces 501 having a protruding curved surface are provided on either one of a surface of the first member 51 that is opposed to the second member 52 and a surface of the second member 52 that is opposed to the first member 51, the plurality of lens surfaces 501 each overlapping with each one of the plurality of pixel electrodes 15 in plan view. Thus, the lens surfaces 501 and the space S form an interface to configure the lens 50. In addition, a translucent third member 53 is provided at an opposite side of the second member 52 from the first member 51.

In the present embodiment, the first member 51 is the substrate body 19 of the first substrate 10, and the second member 52 and the third member 53 each include a translucent film. More specifically, the first member 51 is made out of a quartz substrate, and the second member 52 and the third member 53 are each made out of silicon oxide. The third member 53 is stacked between the second member 52 and the interlayer dielectric 41. In addition, the lens surface 501 is provided on a surface 521 of the second member 52 that is opposed to the first member 51.

In the present embodiment, the lens 50 is configured by using a method that will be described later. Thus, as illustrated in FIGS. 6 and 7, a recessed portion 511 is provided in a region including the pixel area E and on the surface 19s, located on the second member 52 side, of the first member 51 including the substrate body 19. The surface 19s of the substrate body 19 and a surface 521 of the second member 52 are in contact with each other at an outer periphery region 59 surrounding the recessed portion 511 at the outer side thereof. Thus, the space S is comprised of the recessed portion 511. In addition, the plurality of lens surfaces 501 are provided at positions that each overlap with a bottom 512 of the recessed portion 511 at the second member 52 in plan view, and protrude toward the first member 51. However, the plurality of lens surfaces 501 are spaced apart from the bottom 512 of the recessed portion 511, and the lens surfaces 501 as a whole constitute the interface with the space S.

Here, the second member 52 includes a through-hole 525 provided outside the pixel area E and overlapping with the space S in plan view. A portion of the third member 53 forms a protrusion 531 that extends through the through-hole 525 and the space S and protrudes until it is in contact with the first member 51. In the present embodiment, the through-hole 525 is provided at each of both ends of the pixel E in the X-axis direction. The protrusion 531 of the third member 53 is provided at each of both ends of the pixel area E in the X-axis direction so as to penetrate the through hole 525 and the space S and be in contact with the bottom 512 of the recessed portion 511. In this state, the through-hole 525 is filled with the protrusion 531 of the third member 53. Thus, the space S is an airtight space. The inside of the space S is set to be an atmosphere filled with a gas such as air, or under a vacuum atmosphere. Note that the space S may not be an airtight space.

4. Configuration of Refrigerant Passage

As illustrated in FIGS. 4 and 7, in the electro-optical device 100 according to the present embodiment, the electro-optical panel 1 includes an inlet passage 56 that allows a refrigerant to flow into the space S, and an outlet passage 57 that allows the refrigerant to flow out of the space S. In the present embodiment, the inlet passage 56 and the outlet passage 57 are each provided at the outer periphery region 59 located outside the recessed portion 511 and in a region where the first member 51 overlaps with the second member 52. More specifically, in the first member 51, a plurality of grooves 58 are formed in a region of the outer periphery region 59 that overlaps with the second member 52. A portion of the plurality of grooves 58 forms the inlet passage 56, and the other portions of the plurality of grooves 58 form the outlet passage 57.

Furthermore, the frame 9 includes a refrigerant supply passage 96 that communicates with the inlet passage 56 and a refrigerant discharge passage 97 that communicates with the outlet passage 57. Pipes 93 and 94 are connected to the refrigerant supply passage 96 and the refrigerant discharge passage 97.

In the present embodiment, the inlet passage 56 and the outlet passage 57 are each provided at each of both sides of the recessed portion 511 in the X-axis direction. Thus, the refrigerant supply passage 96 and the refrigerant discharge passage 97 are comprised of cutouts 916 and 917 of the frame portion 910, the cutouts 916 and 917 extending in the Y-axis direction and along side portions 913 and 914 opposed to each other in the X-axis direction. In this case, the side portions 913 and 914 include a positioning portion 919 disposed at a position closer to the electro-optical panel 1 than to the cutout 916, 917, which makes it possible to place the electro-optical panel 1 at an appropriate position.

Furthermore, a side of the cutout 916, 917 where a second frame member 92 is disposed is in an opened state. When the electro-optical panel 1 is disposed in a first accommodation portion 915 of the frame portion 910 and the second frame member 92 is disposed in a second accommodation portion 918 of the frame portion 910, the cutout 916, 917 is surrounded by the second frame member 92 and the electro-optical panel 1. This results in formation of the refrigerant supply passage 96 and the refrigerant discharge passage 97 each extending in the Y-axis direction. In addition, the refrigerant supply passage 96 and the refrigerant discharge passage 97 communicate with the inlet passage 56 and the outlet passage 57, each of which is opened at a side surface of the electro-optical panel 1.

Thus, when a refrigerant such as cooling air or cooling water is supplied from the pipe 93, the refrigerant flows into the space S through the refrigerant supply passage 96 and the inlet passage 56 to take heat of the electro-optical panel 1. Then, the refrigerant is discharged through the outlet passage 57 and the refrigerant discharge passage 97. Thus, the refrigerant directly cools the electro-optical panel 1 from the inside thereof, which makes it possible to efficiently cool the electro-optical panel 1.

5. Method of Manufacturing Lens 50 and Groove 58

Figure 8:
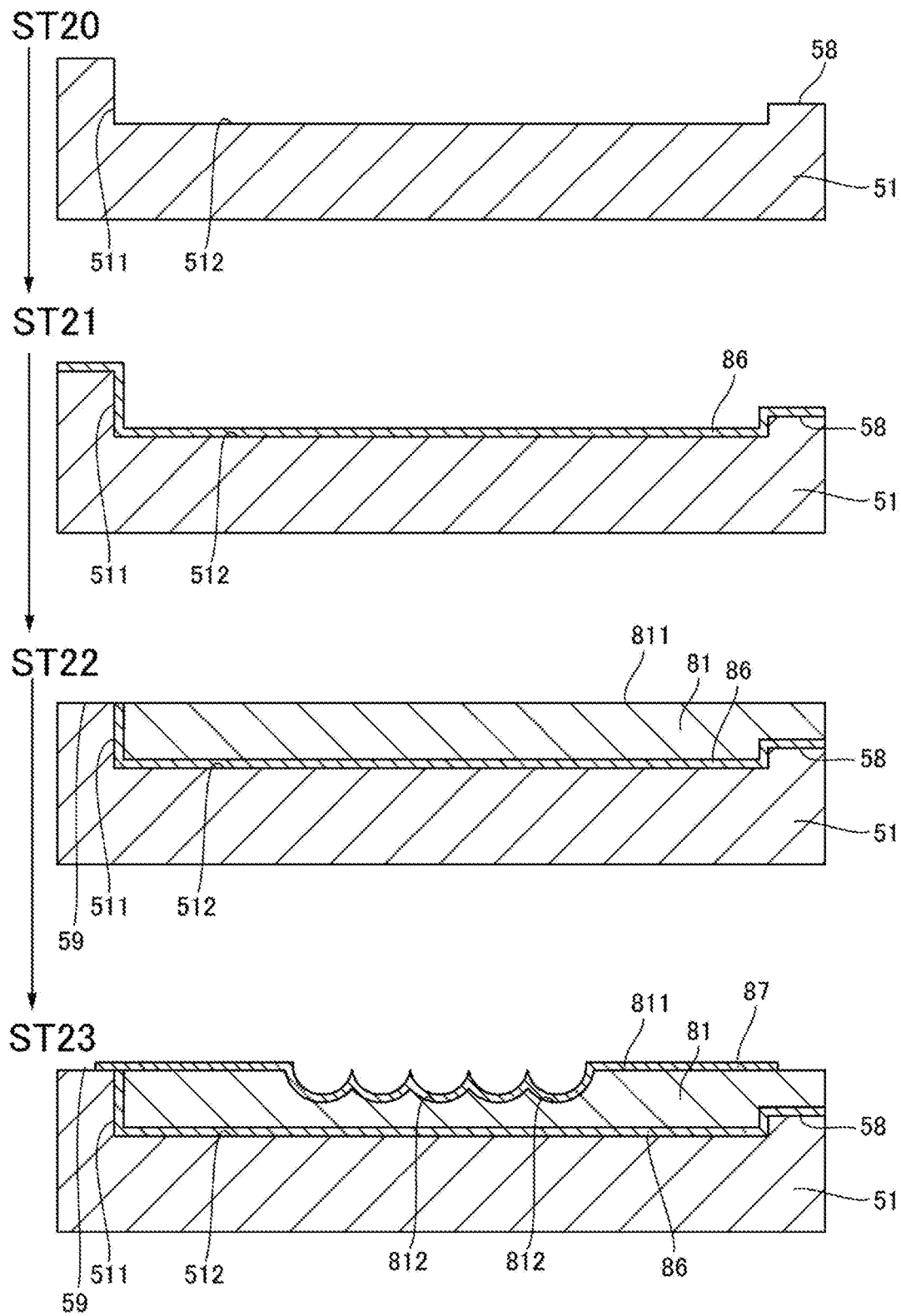
FIG. 8 is a cross-sectional view illustrating steps in a method of manufacturing the electro-optical panel illustrated in FIG. 3.
Figure 9:
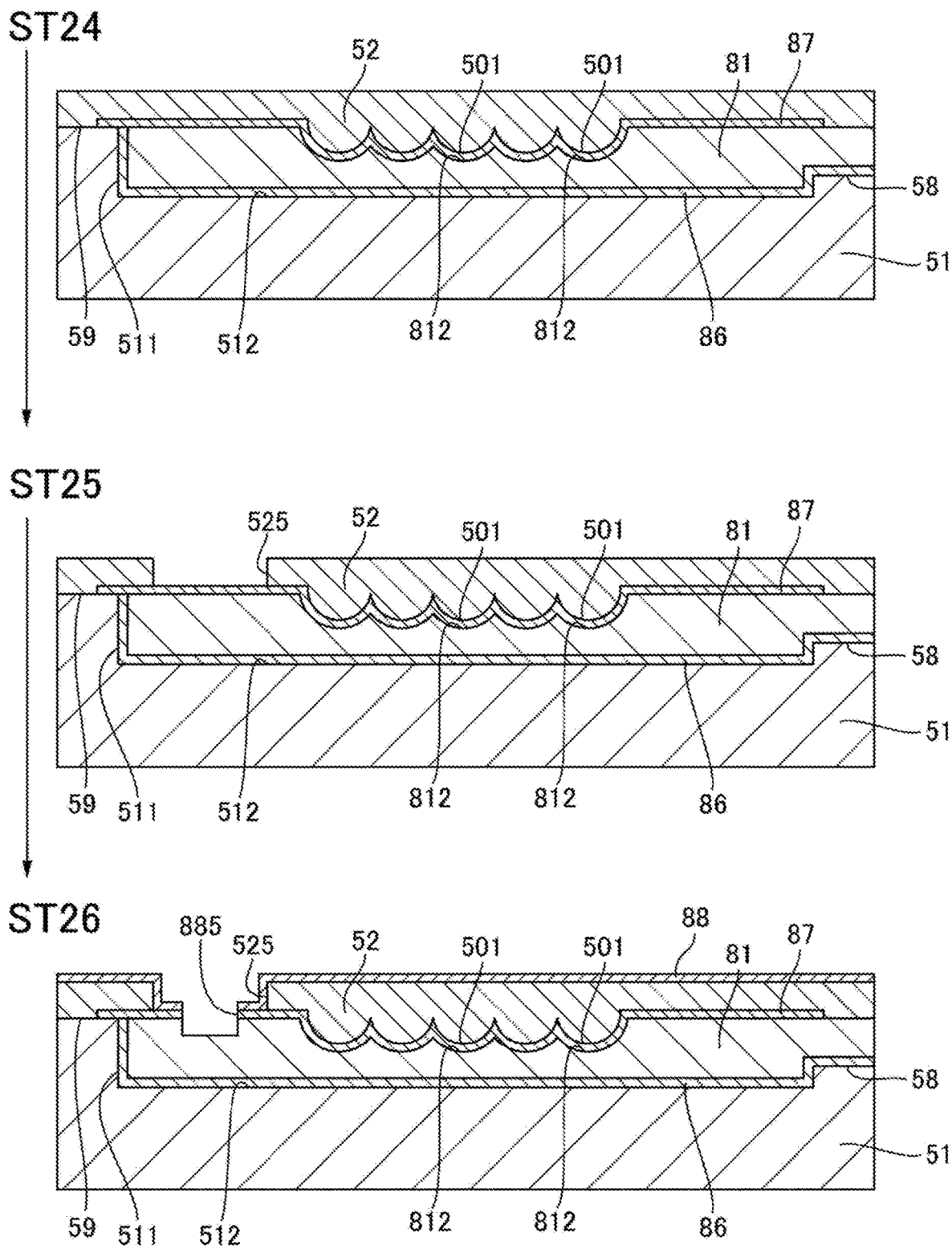
FIG. 9 is a cross-sectional view illustrating steps in the method of manufacturing the electro-optical panel illustrated in FIG. 3.
Figure 10:
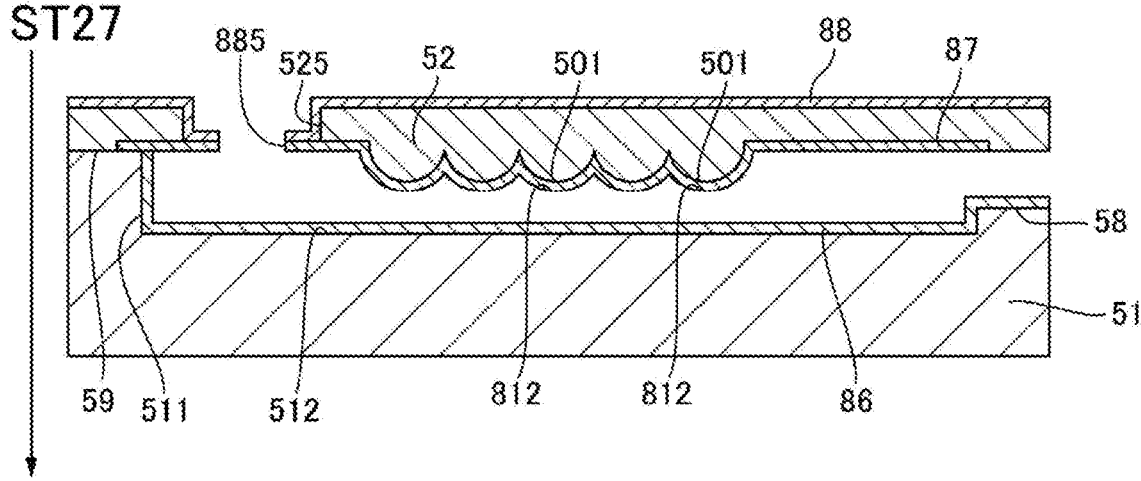
FIG. 10 is a cross-sectional view illustrating steps in the method of manufacturing the electro-optical panel illustrated in FIG. 3.
Figure 10:
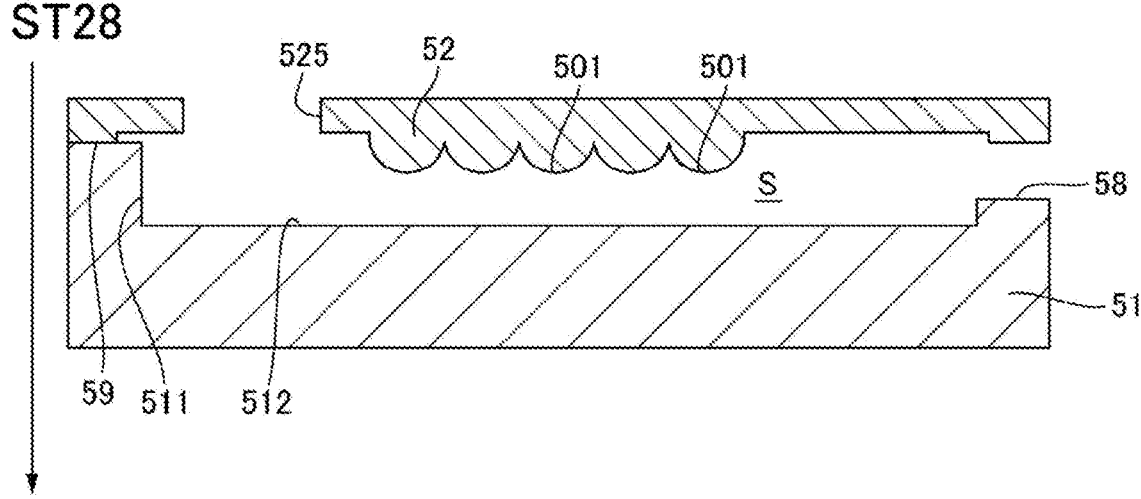
Figure 10:
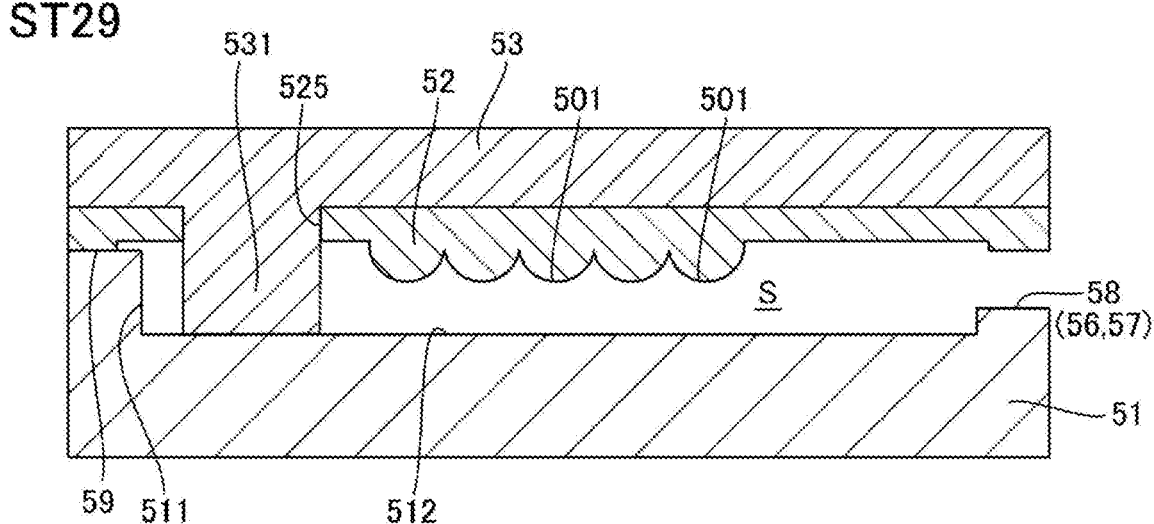

FIGS. 8, 9, and 10 are cross-sectional views each illustrating steps in the method of manufacturing the electro-optical panel 1 illustrated in FIG. 3. FIGS. 8, 9, and 10 schematically illustrate steps of forming the lens 50 illustrated in FIG. 6 or the like from among the steps of manufacturing the electro-optical panel 1. Note that, in FIGS. 8, 9, and 10, in order to facilitate understanding of the steps of forming the groove 58 constituting the inlet passage 56 and the outlet passage 57, and the lens surface 501, the scale or positional relationship of these elements are shifted.

For example, when the first substrate 10 is cut at a position that passes through the groove 58, the protrusion 531 is not supposed to be viewed. However, in FIGS. 8, 9, and 10, the groove 58, the lens surface 501, and the protrusion 531 are all illustrated.

In the present embodiment, in step ST20 illustrated in FIG. 8, in a state where an etching mask is provided on the first member 51, etching is first applied to the first member 51 through an opening portion of the etching mask to form the recessed portion 511. At this time, the groove 58 that communicates with the recessed portion 511 is formed.

Next, in step ST21, a sacrificial film 86 serving as a first sacrificial film is formed so as to fill the recessed portion 511 of the first member 51. There is no limitation as to the material of the sacrificial film 86, provided that the etching selection ratio concerning quartz or silicon oxide is high. In the present embodiment, the sacrificial film 86 is made of silicon. Next, in step ST22, a sacrificial film 81 serving as a second sacrificial film is formed so as to fill the recessed portion 511. Then, the surface of the sacrificial film 81 is flattened using a chemical mechanical polishing (CMP) method or the like.

Next, in step ST23, in a state where an etching mask is provided on the surface of the sacrificial film 81, isotropic etching is applied to the sacrificial film 81 from an opening portion of the etching mask to form a hemispherical concave surface 812 on the surface 811 of the sacrificial film 81. Then, a sacrificial film 87 made of silicon is formed so as to cover the surface of the sacrificial film 81.

Next, in step ST24 illustrated in FIG. 9, after a silicon oxide film is formed, the surface thereof is flattened to make the second member 52. With this step, a portion of the second member 52 that overlaps with the concave surface 812 of the sacrificial film 81 through the sacrificial film 87 serving as a third sacrificial film becomes the lens surface 501 including a protruding curved surface.

Next, in step ST25, in a state where an etching mask is provided on the second member 52, etching is applied to the second member 52 from an opening portion of the etching mask to form the through-hole 525 in the second member 52. Next, in step ST26, after a sacrificial film 88 made of silicon and serving as a fourth sacrificial film is formed so as to cover the second member 52, an etching mask is provided on the sacrificial film 88. In this state, dry etching is applied to the sacrificial films 87 and 88 from an opening portion of the etching mask. This forms a through-hole 885 that overlaps with the through-hole 525. At this time, in the present embodiment, the sacrificial film 81 is made of silicon or silicon oxide. When the sacrificial film 81 is made of silicon, a portion of the sacrificial film 81 is etched when the through-hole 885 is formed. On the other hand, when the sacrificial film 81 is made of silicon oxide, the sacrificial film 81 is not etched when the through-hole 885 is formed.

Next, in step ST27 illustrated in FIG. 10, etching is applied from the through-holes 885 and 525 to remove the sacrificial film 81. At this time, when the sacrificial film 81 is made of silicon oxide, the sacrificial film 81 is etched while the sacrificial films 86, 87, and 88 are not etched. Thus, in step ST28, etchant is changed to remove, through etching, the sacrificial films 86, 87, and 88 made of silicon. On the other hand, when the sacrificial film 81 is made of silicon, the same etchant is used to continuously carry out steps ST27 and ST28.

Next, in step ST29, after the silicon oxide film is formed, the surface thereof is flattened to make the third member 53. At this time, a portion of the third member 53 is also formed within the space S through the through-hole 525. With this step, the portion of the third member 53 extends through the through-hole 525 and the space S to form the protrusion 531 that is in contact with the first member 51. In addition, with the groove 58 connected to the recessed portion 511, the inlet passage 56 and the outlet passage 57, each of which communicates with the space S, are formed between the first member 51 and the second member 52.

In a case of the configuration as described above, in the lens 50, a difference in refractive index at the interface between the lens surface 501 and the space S is large. Thus, it is possible to achieve the lens 50 exhibiting high positive power without using a material having a large refractive index as well as having a low translucent property. In addition, in the present embodiment, the sacrificial films 86, 87, and 88 are provided. Thus, at the time of removing the sacrificial film 81, it is possible to protect the first member 51 and the second member 52. Thus, silicon oxide, which is the same material as the first member 51 and the second member 52, can be used for the sacrificial film 81. By using silicon oxide, it is possible to form a film through a chemical vapor deposition (CVD) method or the like having a high film-forming velocity.

6. Main Effects of Present Embodiment

As described above, the electro-optical device 100 according to the present embodiment includes the translucent first member 51 and the translucent second member 52 opposed to the first member 51 with the space S being interposed therebetween. In addition, the inlet passage 56 and the outlet passage 57, each of which communicates with the space S, are formed between the first member 51 and the second member 52. Thus, it is possible to pass a refrigerant through the space S using the inlet passage 56 and the outlet passage 57, which makes it possible to efficiently cool the electro-optical panel 1. In addition, the first member 51 and the second member 52 are provided at the first substrate 10 side where light enters. This makes it possible to efficiently cool the electro-optical panel 1.

Furthermore, the lens surface 501 including a protruding curved surface is formed at the surface of the second member 52 that is opposed to the first member 51, and the lens surface 501 is in contact with the space S. With this configuration, even when a refrigerant such as cooling air or cooling water is caused to flow through the space S, the lens surface 501 of the lens 50 is brought into contact with a medium having a low refractive index. This renders a difference in refractive index increase at the interface of the lens surface 501, which makes it possible to achieve the lens 50 exhibiting an excellent lens performance. Thus, of light entering from the first substrate 10 side, light traveling toward the light shielding member 18 can be guided to the light transmission area 180. This makes it possible to enhance efficiency of use of light at the time of display an image.

Second Embodiment

Figure 11:
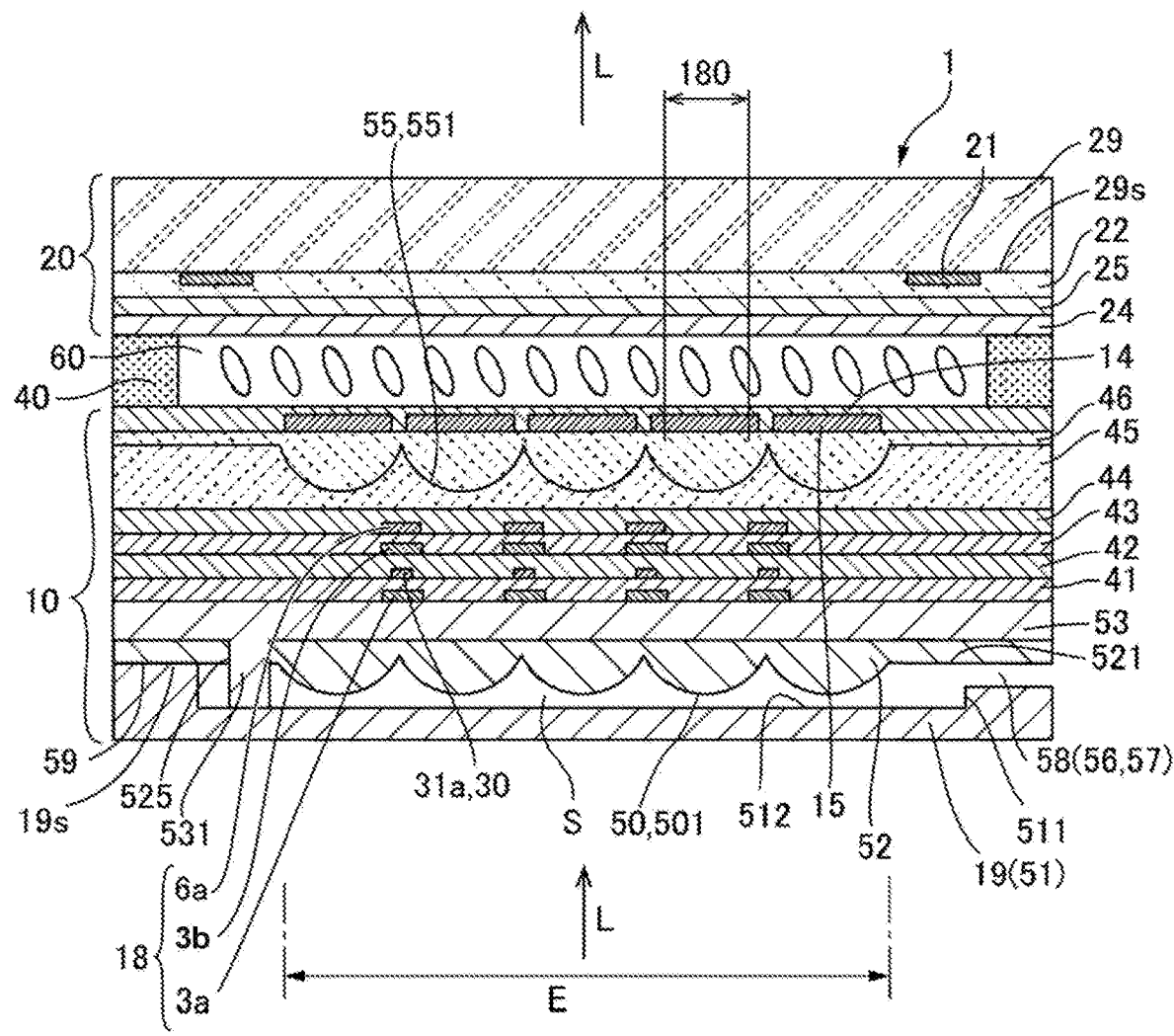
FIG. 11 is an explanatory diagram according to a second embodiment of the present disclosure.

FIG. 11 is an explanatory diagram according to a second embodiment of the present disclosure. Note that the basic configuration according to this embodiment is similar to that in the first embodiment. Thus, common elements are denoted as the same reference characters, and explanation thereof will not be repeated. As illustrated in FIG. 11, in the first substrate 10 of the electro-optical device 100 according to the present embodiment, the lens 50 including the lens surface 501 that is in contact with the space S is formed between the substrate body 19 and the light shielding member 18. In addition, the lens 55 that overlaps with the pixel electrode 15 in plan view is provided between the light shielding member 18 and the pixel electrode 15.

At the time of configuring the lens 55, the lens surface 551 having a concave surface is formed on a surface of the interlayer dielectric 45 that is at the pixel electrode 15 side, and the lens layer 46 is stacked on the surface of the interlayer dielectric 45 that is at the pixel electrode 15 side. In the present embodiment, the interlayer dielectric 45 is made of silicon oxide, and the refractive index is set at 1.48. The lens layer 46 is made of silicon oxynitride, and the refractive index is set at 1.58 to 1.68. This results in the lens 55 having a positive power that causes light to converge. Thus, it is possible to use the lens 55 to optimize the angle of the light beam outputted from the second substrate 20. This makes it possible to suppress vignetting due to the projection optical system when the electro-optical device 100 is used as a light valve in the projection-type display device that will be described later. Thus, it is possible to display a bright image with high quality.

Furthermore, the second substrate 20 does not include a light shielding film in the pixel area E. In other words, the second substrate 20 does not include a black matrix serving as a light shielding film at a position that corresponds to a portion between a pixel electrode 15 and a pixel electrode 15 of the first substrate 10 in plan view. Thus, when passing through the second substrate 20, light L outputted from the second substrate 20 does not experience a phase difference resulting from diffraction due to the black matrix, which results in a reduced possibility of occurrence of disturbance of the polarization state. This makes it possible to suppress a reduction in contrast. In addition, when the second substrate 20 and the first substrate 10 are combined together, a positional shift does not occur between the black matrix of the second substrate 20 and the light shielding member 18 of the first substrate 10, in other words, a set shift does not occur. Thus, the aperture ratio of a pixel P is less likely to reduce, which leads to brightness being less likely to reduce.

Third Embodiment

Figure 12:
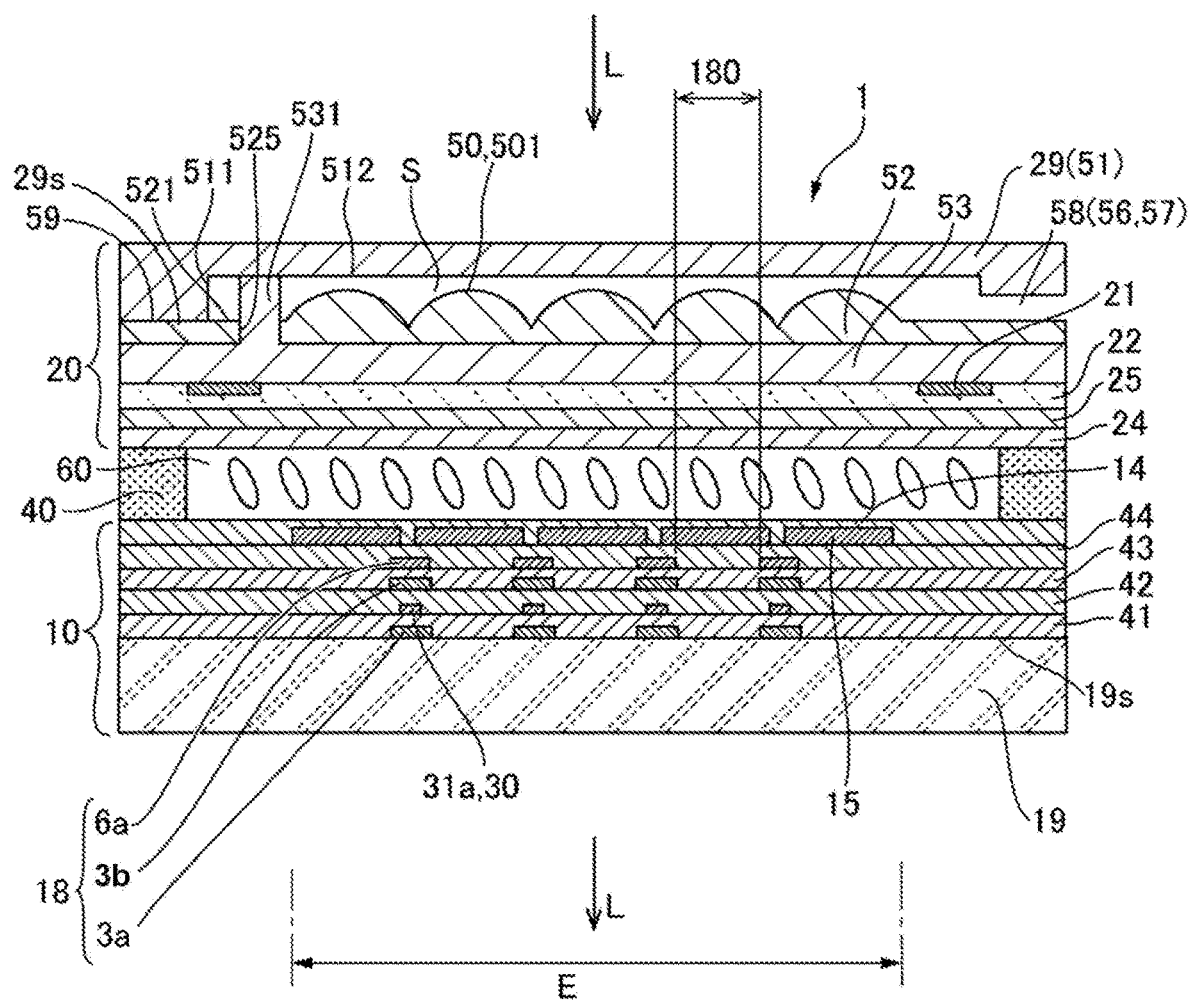
FIG. 12 is an explanatory diagram according to a third embodiment of the present disclosure.

FIG. 12 is an explanatory diagram according to a third embodiment of the present disclosure. Note that the basic configuration according to this embodiment is similar to that in the first embodiment. Thus, common elements are denoted as the same reference characters, and explanation thereof will not be repeated. In the embodiments described above, the first substrate 10 includes the lens 50. However, in the present embodiment, as illustrated in FIG. 12, the lens 50 including the lens surface 501 that is in contact with the space S is formed in the second substrate 20. In the present embodiment, the first member 51 corresponds to the substrate body 29. The second member 52 and the third member 53 are translucent films. The lens 50 can be manufactured using a method similar to the method described in the first embodiment. In a case of the configuration described above, it is possible to guide, to the light transmission area 180, light traveling toward the light shielding member 18 from among light entering from the second substrate 20 side. This makes it possible to enhance efficiency of use of light at the time of displaying an image. In addition, by flowing the refrigerant in the space S, it is possible to efficiently cool the second substrate 20 where light enters.

Fourth Embodiment

Figure 13:
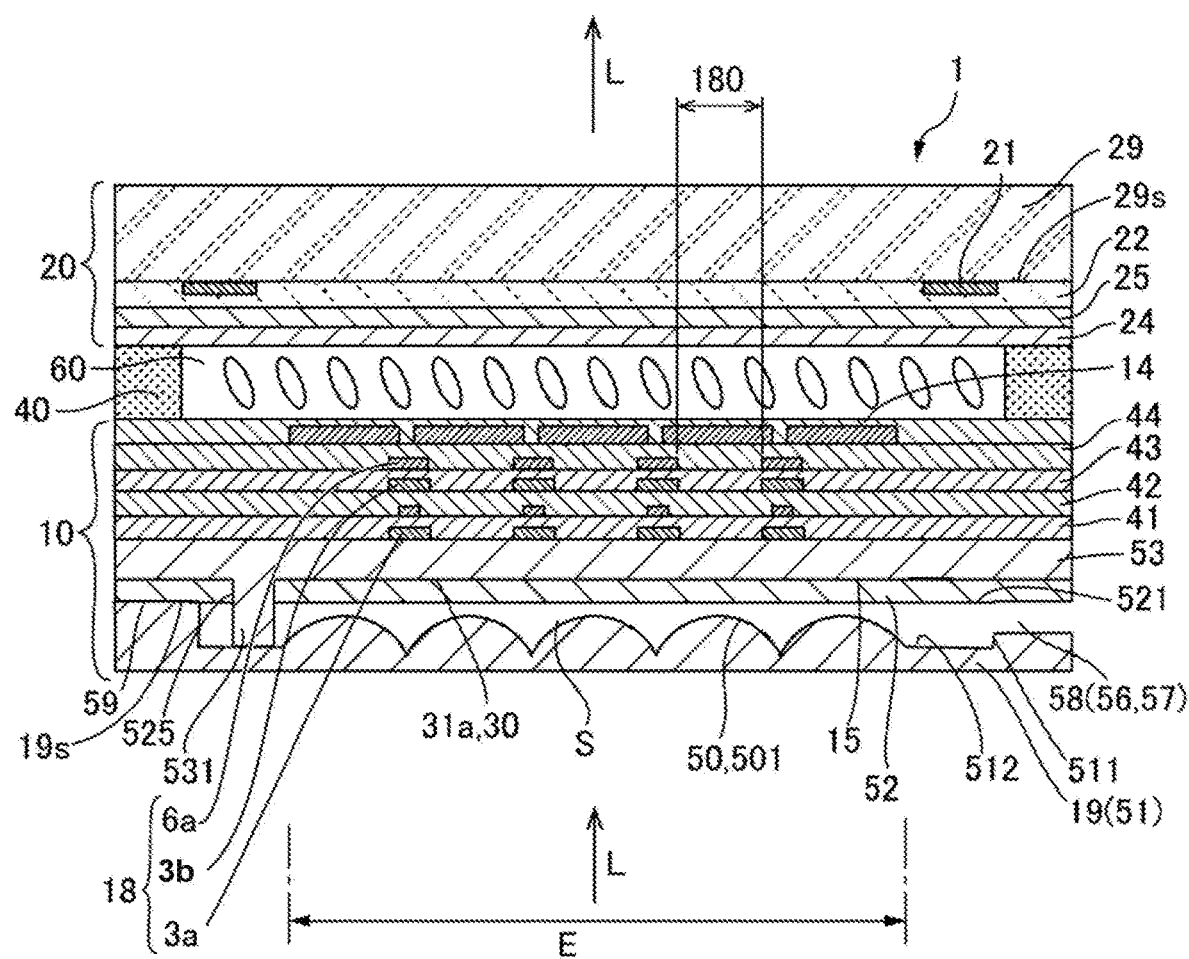
FIG. 13 is an explanatory diagram according to a fourth embodiment of the present disclosure.

FIG. 13 is an explanatory diagram according to a fourth embodiment of the present disclosure. Note that the basic configuration according to this embodiment is similar to that in the first embodiment. Thus, common elements are denoted as the same reference characters, and explanation thereof will not be repeated. In the embodiments described above, the lens surface 501 is formed on the second member 52 that is opposed to the bottom 512 of the recessed portion 511 formed in the first member 51. In the present embodiment, however, the lens surface 501 is formed at the bottom 512 of the recessed portion 511. Such a configuration can be achieved by forming a hemispherical photoresist at the bottom 512 of the recessed portion 511, and then applying dry etching to the photoresist and the bottom 512.

Other Embodiments

In the embodiments described above, the inlet passage 56 and the outlet passage 57 are provided so as to be opposed to each other in the X-axis direction with the space S being interposed therebetween. However, it may be possible to employ a configuration, for example, in which either one of the inlet passage 56 and the outlet passage 57 is provided at both sides of the space S in the X-axis direction, and the other one of the inlet passage 56 and the outlet passage 57 is provided at a side of the space S in the Y-axis direction.

In the embodiments described above, the first member 51 serves as a substrate body. However, the first member 51 may be a translucent film. For example, the present disclosure may be applied to a case where the plurality of interlayer dielectrics illustrated in FIG. 6 are set to be the first member 51, the second member 52, and the third member 53, and the lens 50 is provided between the interlayer dielectrics. In the embodiments described above, the lens 55 may have the same configuration as the lens 50. In addition, in the embodiment described above, the lens 50 including the lens surface 501 that is in contact with the space S is formed. However, the space S may not include the lens 50.

Electronic Device

Figure 14:
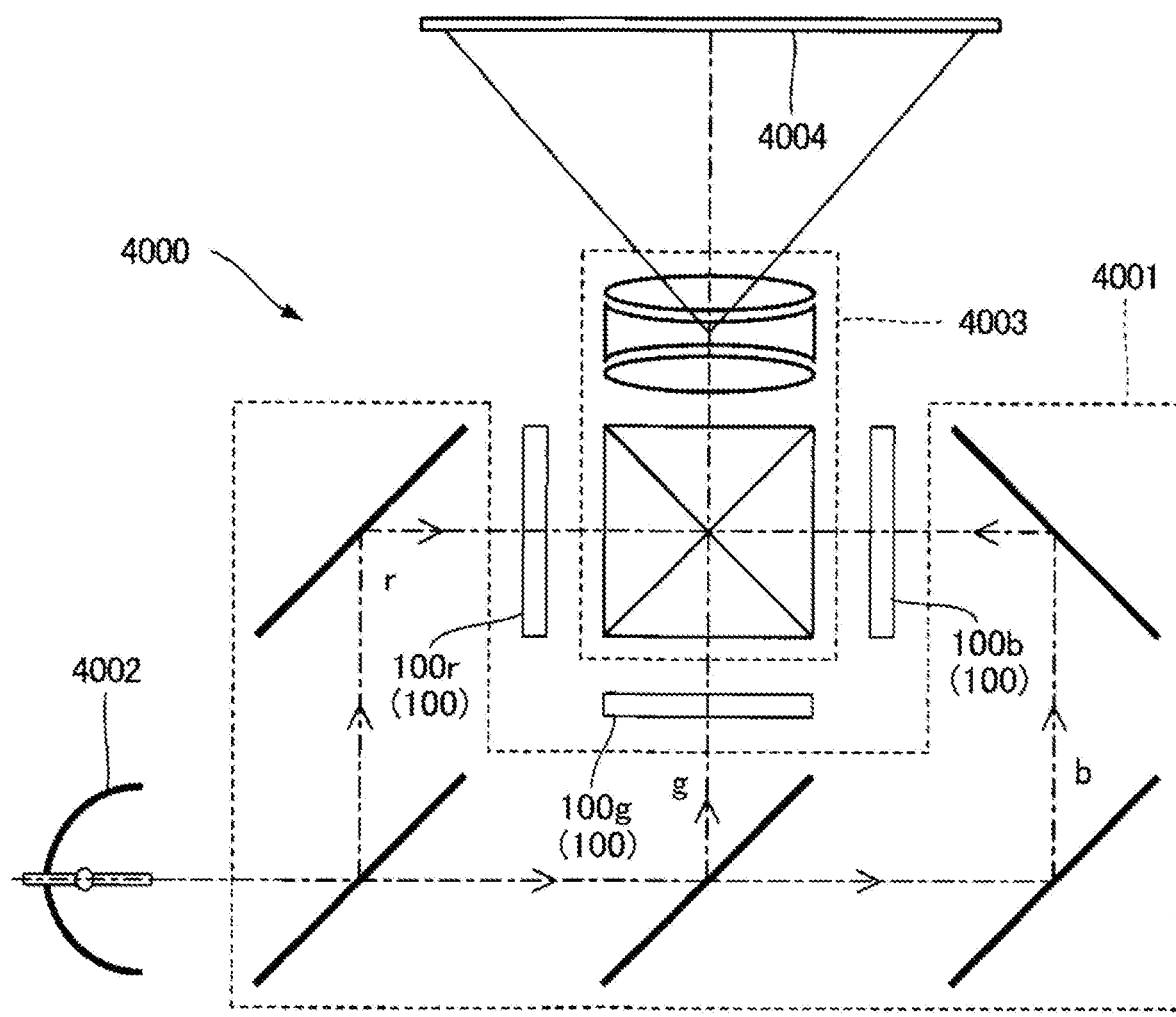
FIG. 14 is an explanatory diagram schematically illustrating a projection-type display device serving as an example of an electronic device.

The electro-optical device 100 to which the present disclosure is applied can be used in various types of electronic devices. FIG. 14 is an explanatory diagram schematically illustrating a projection-type display device serving as an example of an electronic device. The projection-type display device 4000 is a three-plate type projector, for example. A light valve 100r is an electro-optical device 100 corresponding to a display color of red. A light valve 100g is an electro-optical device 100 corresponding to a display color of green. A light valve 100b is an electro-optical device 100 corresponding to a display color of blue. In other words, the projection-type display device 4000 includes three light valves 100r, 100g, and 100b corresponding to the display color of red, the display color of green, and the display color of blue, respectively.

An illumination optical system 4001 supplies the light valve 100r with a red color component r of light emitted from an illumination device 4002 serving as a light source, supplies the light valve 100g with a green color component g, and supplies the light valve 100b with a blue color component b. In accordance with a display image, each of the light valves 100r, 100g, and 100b modulates each one of the single color lights supplied from the illumination optical system 4001. A projection optical system 4003 combines light emitted from the individual light valves 100r, 100g, and 100b to project them onto a projection surface 4004.

Note that the projection-type display device may be configured such that an LED light source, a laser light source, or the like configured to emit light of each color is used as a light source unit, and colored light emitted from such a light source is each supplied to another electro-optical device. In addition, the electro-optical device 100 is not limited to a front projection-type projector configured to project from a side at which a projected image is observed. It may be possible to use a rear projection-type projector configured to project at a side opposite to the side at which a projected image is observed.

These are descriptions of the present disclosure on the basis of the preferred embodiments. However, the present disclosure is not limited to those embodiments described above. In addition, the configuration of each component of the present disclosure may be replaced with any configuration that exerts the equivalent functions of the above-described embodiments, and any configuration may be added.

Furthermore, in the description above, the liquid crystal display device is described as one example of the electro-optical device. However, the electro-optical device is not limited to this. For example, it is possible to apply the electro-optical device to an imaging sensor or the like. In addition, it is also possible to apply the electro-optical device, for example, to a display panel using a light emitting element such as an organic electro luminescence (EL), an inorganic EL, a light emitting polymer, or the like, as in the embodiments described above. Furthermore, it is also possible to apply the present disclosure to an electrophoresis display panel using a micro capsule containing a colored liquid and white particles dispersed in the liquid, as in the embodiments described above.

What is claimed is:

1. An electro-optical device comprising
an electro-optical panel including:
a first member having a translucent property;
a second member having a translucent property and opposed to the first member with a space being interposed therebetween; and
a plurality of pixel electrodes provided at an opposite side from the first member with respect to the second member, wherein
a plurality of lens surfaces, each having a protruding curved surface, are formed at either one of a surface, opposed to the second member, of the first member, and a surface, opposed to the first member, of the second member, the plurality of lens surfaces each overlapping, in plan view, with each of the plurality of pixel electrodes respectively, and
the space communicates with an inlet passage through which a refrigerant flows into the space, and also communicates with an outlet passage through which the refrigerant flows out of the space.

2. The electro-optical device according to claim 1 comprising:
a frame configured to support the electro-optical panel, wherein
the frame includes:
a refrigerant supply passage communicating with the inlet passage; and
a refrigerant discharge passage communicating with the outlet passage.

3. The electro-optical device according to claim 1, wherein
a surface of the first member that is opposed to the second member includes a recessed portion that is recessed toward an opposite side from the second member, the recessed portion being provided in a region that overlaps, in plan view, with a pixel area in which the pixel electrodes are arranged, and
the plurality of lens surfaces are provided in a region that overlaps, in plan view, with a bottom of the recessed portion.

4. The electro-optical device according to claim 3, wherein
the inlet passage and the outlet passage are provided in a region where the first member overlaps with the second member outside the recessed portion.

5. The electro-optical device according to claim 3, wherein
the second member includes, outside the pixel area, a through-hole that overlaps, in plan view, with the space,
a third member having a translucent property is provided at an opposite side from the first member with respect to the second member, and
a portion of the third member extends through the through-hole and the space and protrudes up to a position where the portion contacts the first member.

6. The electrode-optical device according to claim 1 comprising:
a first substrate including the pixel electrodes and a switching element electrically coupled to the pixel electrodes; and
a second substrate opposed to the first substrate with an electro-optical layer being interposed between the first substrate and the second substrate, wherein
the first member, the space, and the second member are provided at a substrate located at a side where light enters, from among the first substrate and the second substrate.

7. The electro-optical device according to claim 6, wherein
the first member is a light-transmitting substrate body of a substrate at a side where light enters, from among the first substrate and the second substrate, and
the second member includes a translucent film.

8. An electronic device comprising the electro-optical device according to claim 1.

* * * * *